(12) United States Patent
Stradella et al.

(10) Patent No.: US 7,341,073 B2
(45) Date of Patent: Mar. 11, 2008

(54) VALVE MEMBER FOR A BALANCED PRESSURE REDUCER

(75) Inventors: Giuseppe Stradella, Camogli (IT); Fabio Stradella, Camogli (IT)

(73) Assignee: R.G. S.A.S. Di Rosario Galli & Co., Camogli (IT)

( * ) Notice: Subject to any disclaimer, the term of this patent is extended or adjusted under 35 U.S.C. 154(b) by 155 days.

(21) Appl. No.: 11/193,402

(22) Filed: Aug. 1, 2005

(65) Prior Publication Data
US 2006/0097213 A1   May 11, 2006

(30) Foreign Application Priority Data
Jul. 30, 2004   (FR) .................................... 04 51729

(51) Int. Cl.
*G05D 16/02* (2006.01)

(52) U.S. Cl. ............ 137/505.18; 137/375; 137/505.41; 137/505.42

(58) Field of Classification Search ................ 137/505, 137/18, 375, 505.41, 505.42; 251/358
See application file for complete search history.

(56) References Cited

U.S. PATENT DOCUMENTS

| | | | | |
|---|---|---|---|---|
| 1,352,735 | A | * 9/1920 | Egerton ....................... 251/358 |
| 1,781,129 | A | * 11/1930 | Sexauer ....................... 251/357 |
| 2,745,631 | A | * 5/1956 | Shellman ..................... 251/175 |
| 2,918,089 | A | * 12/1959 | McFarland, Jr. ............. 251/331 |
| 3,086,550 | A | * 4/1963 | Cummings ................... 137/514 |
| 4,129,144 | A | * 12/1978 | Andersson et al. ......... 137/541 |
| 5,139,046 | A | 8/1992 | Galli |
| 5,413,096 | A | * 5/1995 | Hart ...................... 128/205.24 |
| 5,746,198 | A | 5/1998 | Taba et al. |
| 5,911,220 | A | 6/1999 | Morgan et al. |
| 2002/0157669 | A1 | 10/2002 | Chen |

* cited by examiner

*Primary Examiner*—Stephen M. Hepperle
(74) *Attorney, Agent, or Firm*—Sughrue Mion, PLLC

(57) ABSTRACT

A valve member (1) for a balanced pressure reducer, said valve member (1) having a wide head (1') designed to co-operate with a valve seat (6), said valve member (1) having a central body (2) made of a material that is hard and that withstands high pressures, said central body (2) being covered at least in part with a first layer (3) of a rigid plastics material, said first layer (3) of a rigid plastics material being covered at least in part with a second layer (5) of a less rigid plastics material, no contact between the less rigid second layer (5) and the central body (2) occurring in that zone of said valve member (1) which is subjected to the high pressures.

21 Claims, 1 Drawing Sheet

VALVE MEMBER FOR A BALANCED PRESSURE REDUCER

Figure 1:
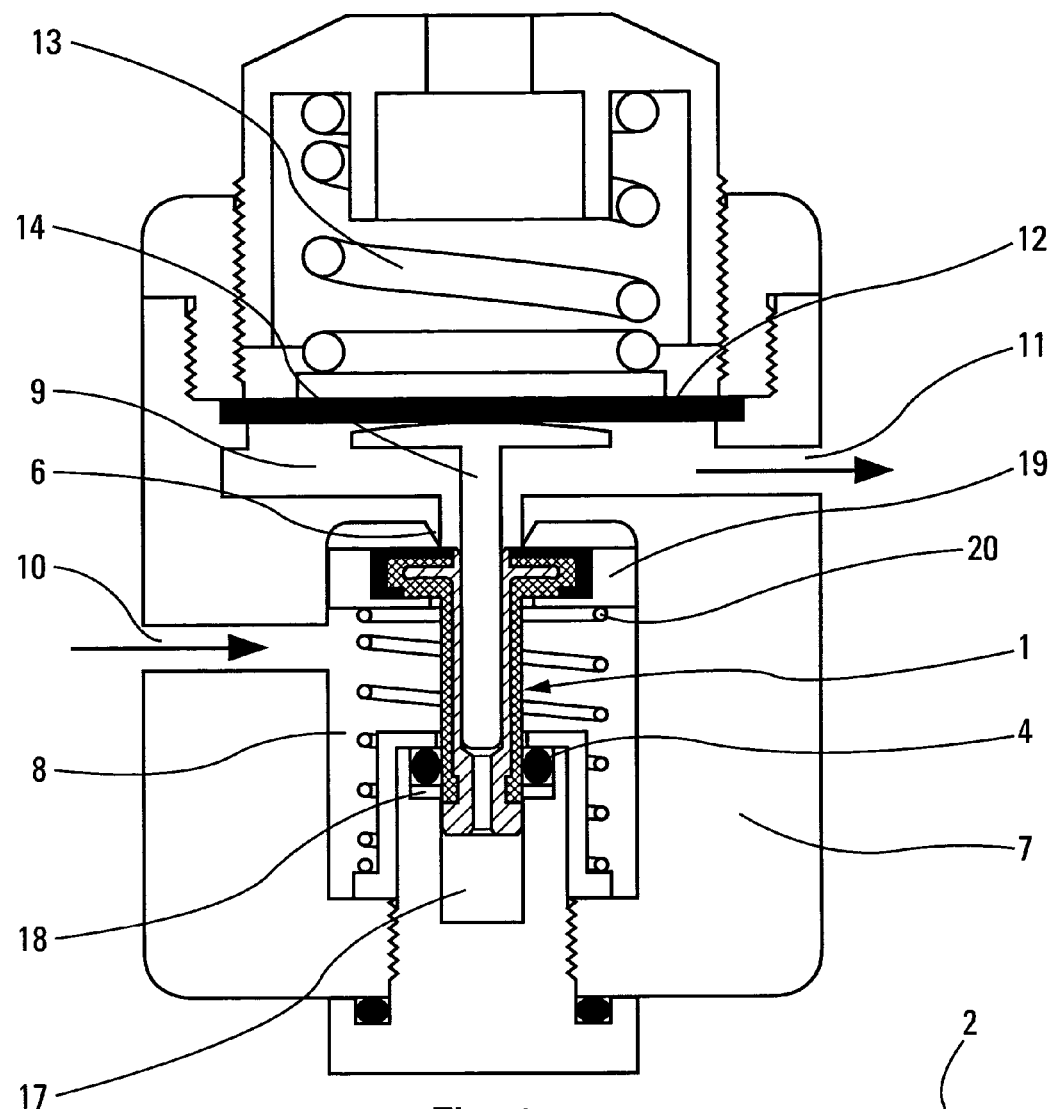

The present invention relates to a valve member for a balanced pressure reducer, and in particular for a high-pressure balanced pressure reducer.

A balanced pressure reducer, in particular for breathing apparatus operating at high-pressures (200 bars/300 bars), generally comprises a moving valve member that is mounted to move axially inside a high-pressure chamber formed in the body of the device. The moving valve member has a wide head connected to a stem. An axial bore extends from the head through the stem and acts as pressure-balancing means. The moving valve member is disposed between a high-pressure inlet, a valve seat that separates the high-pressure chamber from a low-pressure chamber, and a sealing gasket, such as an O-ring gasket, that defines a pressure-balancing chamber. The valve seat acts against a relatively flexible portion of the head of the valve member, and the O-ring gasket acts against the stem of said valve member. In order to obtain pressure balancing, the diameters of the high-pressure valve seat and of the stem of the valve member are usually of the same size.

Various solutions have been proposed for implementing said moving member. Document U.S. Pat. No. 5,746,198 discloses a moving valve member that is made of metal and that, at the top surface of the wide head, has a molded flexible plastics material that is retained mechanically and bonded chemically to the metal head of said valve member. The purpose of that relatively flexible material is to rest against the high-pressure valve seat. That implementation suffers from certain drawbacks. The junction between the flexible plastics material, which covers the wide head only, and metal body of the valve member is exposed to the action of the high pressure. That can give rise to delaminating or peeling of the plastics layer, and that can be extremely dangerous because the high pressure might then pass directly into the low-pressure chamber. In order to solve that problem, provision is made to apply a binder agent to the metal head of the valve member. In addition to being very costly and difficult to reproduce repeatably, that procedure does not completely remove the risk of delaminating or of peeling of the flexible plastics layer, since the metal body and the plastics layer remain two materials that are not chemically compatible. In addition, in the event that the plastic layer suffers wear, the system no longer provides any leaktight closure because the high-pressure valve seat comes directly into contact with the metal head of the valve member. Another solution is described in Document U.S. Pat. No. 5,139,046 which discloses a moving valve member that also has a metal body, a flexible plastics material being molded on the entire wide head of said valve element and also over most of the stem, leaving only the axial bore and a shoulder adjacent to the free end of the stem exempt from plastics material. In that implementation, the entire portion of that valve member that is exposed to the high pressure (head and stem) is covered continuously with a flexible material overmolded on the metal body of the valve member, and therefore any risk of delaminating or of peeling is avoided. However, the fact that the plastics covering must be flexible enough to form good sealing against the high-pressure valve seat is associated with the fact that said plastics covering also covers most of the stem, and that association can itself suffer from a drawback. The sealing gasket of the balancing chamber, which gasket is, in general, implemented in the form of an O-ring gasket that co-operates with the stem, might then compress the flexible plastics layer and form a sort of groove. The result could then be a reduction in the diameter of the stem, with harmful consequences on balancing the pressure and increased friction while the moving valve member is moving, with a resulting delay in valve opening at the valve seat.

An object of the present invention is to provide a valve member for a balanced pressure reducer that does not reproduce the above-mentioned drawbacks.

Thus, an object of the present invention is to provide an improved valve member for a balanced pressure reducer that removes any risk of delaminating or of peeling of the flexible plastics layer which co-operates with the valve seat, and that also removes any risk of deformation of said valve member, in particular at the O-ring sealing gasket of the balancing chamber.

Another object of the present invention is to provide such a valve member for a balanced pressure reducer that is simple and inexpensive to manufacture and to assemble, and that is reliable to use.

The present invention thus provides a valve member for a balanced pressure reducer, said valve member having a wide head designed to co-operate with a valve seat, said valve member being characterized in that said valve member has a central body made of a material that is hard and that withstands high pressures, said central body being covered at least in part with a first layer of a rigid plastics material, said first layer of a rigid plastics material being covered at least in part with a second layer of a less rigid plastics material, no contact between the less rigid second layer and the central body occurring in that zone of said valve member which is subjected to the high pressures.

Advantageously, said central body is hollow and is provided with an axial through bore.

Advantageously, in cross-section, the valve member has a T-shape, comprising a hollow stem and a wide head, said valve member co-operating with said valve seat at the top surface of said wide head.

Advantageously, said central body is made of metal.

Advantageously, a sealing gasket, such as an O-ring gasket, co-operates with said valve member, said gasket being in contact with said first layer of a rigid plastics material.

Advantageously, said first layer covers substantially all of the wide head, and said second layer covers substantially all of the top surface of the wide head.

Advantageously, said first layer covers most of said central body of the valve member.

Advantageously, the first layer of a rigid plastics material is molded on said central body.

Advantageously, said second layer is overmolded on said first layer, in particular by injection molding.

Advantageously, the plastics materials forming said first and second layers are chemically compatible and of different hardnesses and/or of different moduli of elasticity.

Advantageously, the plastics materials forming said first and second layers are of the same type, such as a thermoplastic elastomer.

Advantageously, said first and second layers are formed from the same plastics material, such as a thermoplastic elastomer, in particular polyurethane, the first layer being reinforced with reinforcement means, such as glass fibers.

Advantageously, after molding, said first and second layers are intimately bonded to each other, said bonding withstanding high pressures, such as 300 bars or more, even at the junction points that are subjected to such pressures.

The present invention also provides a balanced pressure reducer, in particular for high-pressure gases, comprising a body defining a high-pressure inlet and a low-pressure outlet, said balanced pressure reducer being characterized in that it further comprises a valve member as defined above.

Advantageously, said valve member is disposed between said high-pressure inlet and said low-pressure outlet, said valve member being mounted to move between an open position, in which it opens a passageway between said high-pressure inlet and said low-pressure outlet, and a closed position, in which it co-operates with a valve seat to close off said passageway, said valve member being moved towards its open position by a control member which, when the gas pressure is lower than a predetermined pressure threshold, is urged by a first resilient member such as a spring towards an actuation position corresponding to the open position of the valve member, said first resilient member no longer urging said control member towards it actuation position as from said predetermined pressure threshold, so that said valve member is then urged resiliently towards it closed position by a second resilient member such as a spring.

Advantageously, said control member is separated from said first resilient member by a diaphragm.

Figure 2:
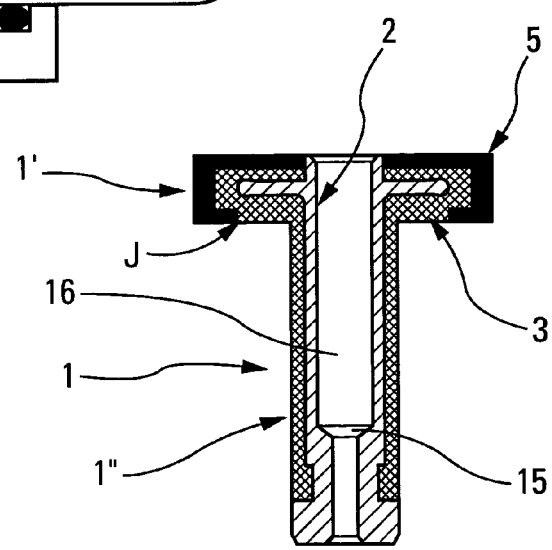

Other characteristics and advantages of the present invention appear more clearly from the following detailed description of a particular embodiment thereof, given with reference to the accompanying drawings, which are given by way of non-limiting example, and in which:

FIG. 1 is a diagrammatic section view of an advantageous embodiment of a balanced pressure reducer of the present invention, with the valve member in the closed position; and FIG. 2 is a diagrammatic section view of the valve member shown in FIG. 1.

With reference to FIG. 1, the pressure reducer comprises a main body 7 which defines a high-pressure chamber 8, a low-pressure chamber 9, a high-pressure inlet 10, and a low-pressure outlet 11. The low-pressure chamber 9 is separated from the high-pressure chamber 8 by a valve comprising a valve seat 6 co-operating with a moving valve member 1. The valve seat 6 preferably has the shape of a sharp-edged annular surface which co-operates with a portion of the top surface of a wide head 1' of the moving member 1 in order to provide excellent leaktightness when the valve member is in the closed position.

The moving valve member 1, shown in more detail in FIG. 2, is advantageously T-section, with a stem portion 1" connected to a wide head portion 1'. Said valve member 1 is preferably hollow and it is therefore provided with a through axial bore 16. Advantageously, a shoulder 15 is provided inside said through bore 16. In addition, the low-pressure chamber 9 is closed by a diaphragm 12 which separates a first resilient member 13, such as a load spring, from a control member 14 disposed to move inside said low-pressure chamber 9. The control member 14 thus rests on one side against the diaphragm 12 and on the other side, via an axial extension, against the shoulder 15 provided inside the through bore 16 formed in the moving valve member 1, in order to feed a balancing chamber 17 with low pressure. The balancing chamber 17 is closed in airtight manner by means of a sealing gasket 4, in particular an O-ring gasket, and by a suitable ring, such as an anti-extrusion ring 18, both of which act on the stem 1" of the moving valve member 1.

The moving valve member 1 is inserted into a guide member 19 provided with suitable side openings (not shown) so as to enable gas to flow through, said guide member resting against a second resilient member 20, such as a spring, which urges said moving valve member 1 towards its closed position. Preferably, the diameter of the stem 1" of the moving valve member 1 and the diameter of the valve seat 6 are identical, so as to ensure that the pressure reducer is well balanced.

When the low-pressure outlet 11 is closed, the pressure in the low-pressure chamber 9 acting against the diaphragm 12 overcomes the load from the load spring 13, so that the control member 14 is not compressed towards the moving valve member 1. The moving valve member 1, urged by its own spring 20, then closes the valve by pressing against the valve seat 6.

In this condition, the system is totally balanced: the high pressure acts over the entire surface area of the moving valve member 1 except for its portion that is situated inside the diameter of the valve seat 6 and except for the corresponding portion of the cross-section of the stem, these two excluded portions having the same size. Likewise, the low pressure acts on the area of the head 1' of the valve member 1 that is defined by the valve seat 6 and on the area corresponding to the cross-section of the stem, these portions also being of the same size.

In this situation, even a small amount of air flowing out via the low-pressure outlet and a considerable reduction in the pressure in the chamber 9 cause the diaphragm to move downwards under drive from the load spring 13, so that the valve is opened immediately by means of the control member 14 which moves the moving valve member 1 relative to the valve seat 6. When the valve is opened, gas can flow from the high-pressure chamber 8 towards the low-pressure chamber 9 (and thus towards the low-pressure outlet 11) until the pressure in the low-pressure chamber 9 reaches, once again, the threshold at which the load from the load spring 13 is overcome. Whereupon, the diaphragm 12 compresses said load spring 13, so that the return spring 20 of the valve member 1 can return said valve member towards its closed position, shown in FIG. 1.

In accordance with the invention, the moving valve member 1 has a central body 2 made of a material that is hard and that withstands high pressures, which can typically lie in the range 200 bars to 300 bars in this type of pressure reducer. Preferably, the rigid central body 2 is made of metal. A first layer 3 of a plastics material that is relatively rigid is molded on at least a portion of said central body 2. Said first layer 3 must be sufficiently hard and rigid to withstand the mechanical action of the O-ring gasket 4 at the stem, without being compressed. A second layer 5 of a less rigid plastics material is then overmolded on at least a portion of said first layer 3. As can be seen in FIG. 2, the first layer 3 advantageously extends around the wide head 1' and over most of the stem 1" of the moving valve member 1, and the second layer 5 extends at least substantially over the entire top surface of the wide head 1', and advantageously also substantially around said wide head. Said second layer 5 must be sufficiently flexible and resilient to provide good leaktightness against the valve seat 6 when the valve is closed. Preferably, the plastics materials of said two layers 3 and 5 are chemically compatible. This can, in particular, be achieved by providing a plastics material of the same type, which is advantageously identical, but of hardness and/or of modulus of elasticity that is/are different. For example, it is possible to imagine using a thermoplastic elastomer material, such as polyurethane, for making the two layers 3 and 5. The more rigid layer 3 can be reinforced with reinforcement means, such as glass fibers, while the more flexible layer 5 does not contain said reinforcement means or contains less reinforcement. Other materials can naturally be used, and the two layers 3 and 5 are not necessarily formed from identical materials.

The advantages of the present invention are numerous. Thus, after assembly, in particular by injection overmolding, the two layers 3 and 5 form a single solid piece, with no risk of delaminating or peeling of the flexible portion 5 co-operating with the valve seat 6. During the injection overmolding step, the surfaces of the two layers 3 and 5 that are in contact with each other melt together and bond intimately with each other, so that said two layers then behave as if they were integrally molded. Even in the example shown in the figures, which shows a junction point J between the first layer 3 and the second layer 5 in the zone exposed to high pressures, there is no risk of delaminating or peeling because of said intimate bonding between the two plastics layers. The present invention thus totally removes the need to use any binder agent between said layers 3 and 5. There is also no longer any need to use a binder agent between the first layer 3 and the metal central body 2, since no junction between the two portions is exposed to the high pressure. The present invention also makes it possible to choose material hardness that is ideal firstly for closing at the valve seat 6 and secondly for the zone that co-operates with the O-ring gasket 4. In addition, in the event that the second layer 5 made of the less rigid plastics material suffers wear, the high pressure acts under all circumstances against the first layer 3 made of the rigid plastics material, which is not metal, and which is therefore capable of significantly limiting the flow of high-pressure gas.

The present invention thus makes it possible to remove the drawbacks of the various valve members disclosed by the prior art, and thus provides a valve member that is simple and reliable, that is adaptable to any type of existing pressure reducer, and that is inexpensive to manufacture and to assemble.

Although the above description is given with reference to a particular embodiment of the present invention, naturally the person skilled in the art can make useful modifications to it without going beyond the ambit of the present invention as defined by the accompanying claims.

The invention claimed is:

1. A balanced pressure reducer for high-pressure gases, comprising:
   a body defining a high-pressure inlet and a low-pressure outlet; and
   a valve member (1) having a wide head (1') designed to co-operate with a valve seat (6) of the body, said valve member (1) having a central body (2) made of a material that is hard and that withstands high pressures and covered at least in part with a first layer (3) of a rigid plastics material, said first layer (3) of a rigid plastics material covered at least in part with a second layer (5) of a less rigid plastics material, and wherein no contact between the less rigid second layer (5) and the central body (2) occurs in that zone of said valve member (1) which is subjected to the high pressures.

2. A balanced pressure reducer according to claim 1, in which said central body (2) is hollow and is provided with an axial through bore.

3. A balanced pressure reducer according to claim 1, in which, in cross-section, the valve member (1) has a T-shape, comprising a hollow stem (1") and a wide head (1'), said valve member (1) co-operating with said valve seat (6) at the top surface of said wide head (1').

4. A balanced pressure reducer according to claim 1, in which said central body (2) is made of metal.

5. A balanced pressure reducer according to claim 1, in which a sealing gasket (4) co-operates with said valve member (1), said gasket (4) being in contact with said first layer (3) of a rigid plastics material.

6. A balanced pressure reducer according to claim 1, in which said first layer (3) covers substantially all of the wide head (1') and most of the central body of the valve member, and said second layer (5) covers substantially all of the top surface of the wide head (1').

7. A balanced pressure reducer according to claim 1, in which the first layer (3) of a rigid plastics material is molded on said central body (2).

8. A balanced pressure reducer according to claim 1, in which said second layer (5) is overmolded on said first layer (3), in particular by injection molding.

9. A balanced pressure reducer according to claim 1, in which the plastics materials forming said first and second layers (3, 5) are chemically compatible and of different hardnesses and/or of different moduli of elasticity.

10. A balanced pressure reducer according to claim 1, in which the plastics materials forming said first and second layers (3, 5) are of the same type.

11. A balanced pressure reducer according to claim 1, in which said first and second layers (3, 5) are formed from the same plastics material the first layer (3) being reinforced.

12. A balanced pressure reducer according to claim 1, in which said valve member (1) is disposed between said high-pressure inlet (10) and said low-pressure outlet (11), said valve member (1) being mounted to move between an open position, in which it opens a passageway between said high-pressure inlet (10) and said low-pressure outlet (11), and a closed position, in which it co-operates with a valve seat (6) to close off said passageway, said valve member (1) being moved towards its open position by a control member (14) which, when the gas pressure is lower than a predetermined pressure threshold, is urged by a first resilient member (13) towards an actuation position corresponding to the open position of the valve member (1), said first resilient member (13) no longer urging said control member (14) towards the actuation position as from said predetermined pressure threshold, so that said valve member (1) is then urged resiliently towards the closed position by a second resilient member (20).

13. A balanced pressure reducer according to claim 12, in which said control member (14) is separated from said first resilient member (13) by a diaphragm (12).

14. The balanced pressure reducer according to claim 1, wherein the high pressures are at least 200 bars.

15. The balanced pressure reducer according to claim 1, wherein the high pressures are at least 200 bars.

16. The balanced pressure reducer according to claim 1, wherein the valve seat is defined by an annular sharp edge that contacts the wide head to created a seal.

17. The balanced pressure reducer according to claim 5, in which a sealing gasket (4) is an O-ring gasket.

18. The balanced pressure reducer according to claim 10, wherein plastics materials forming the first and second layers are made from a thermoplastic elastomer.

19. The balanced pressure reducer according to claim 11, wherein the first and second layers are formed from a thermoplastic elastomer.

20. The balanced pressure reducer according to claim 19, wherein the first and second layers are formed from polyurethane and the first layer is reinforced with glass fibers.

21. The balanced pressure reducer according to claim 12, wherein the first and second resilient members are springs.

* * * * *